No Printed Specification Available
1597X
A. TANNER.
HEMP AND FLAX MACHINE.
Patented Oct. 24, 1811.
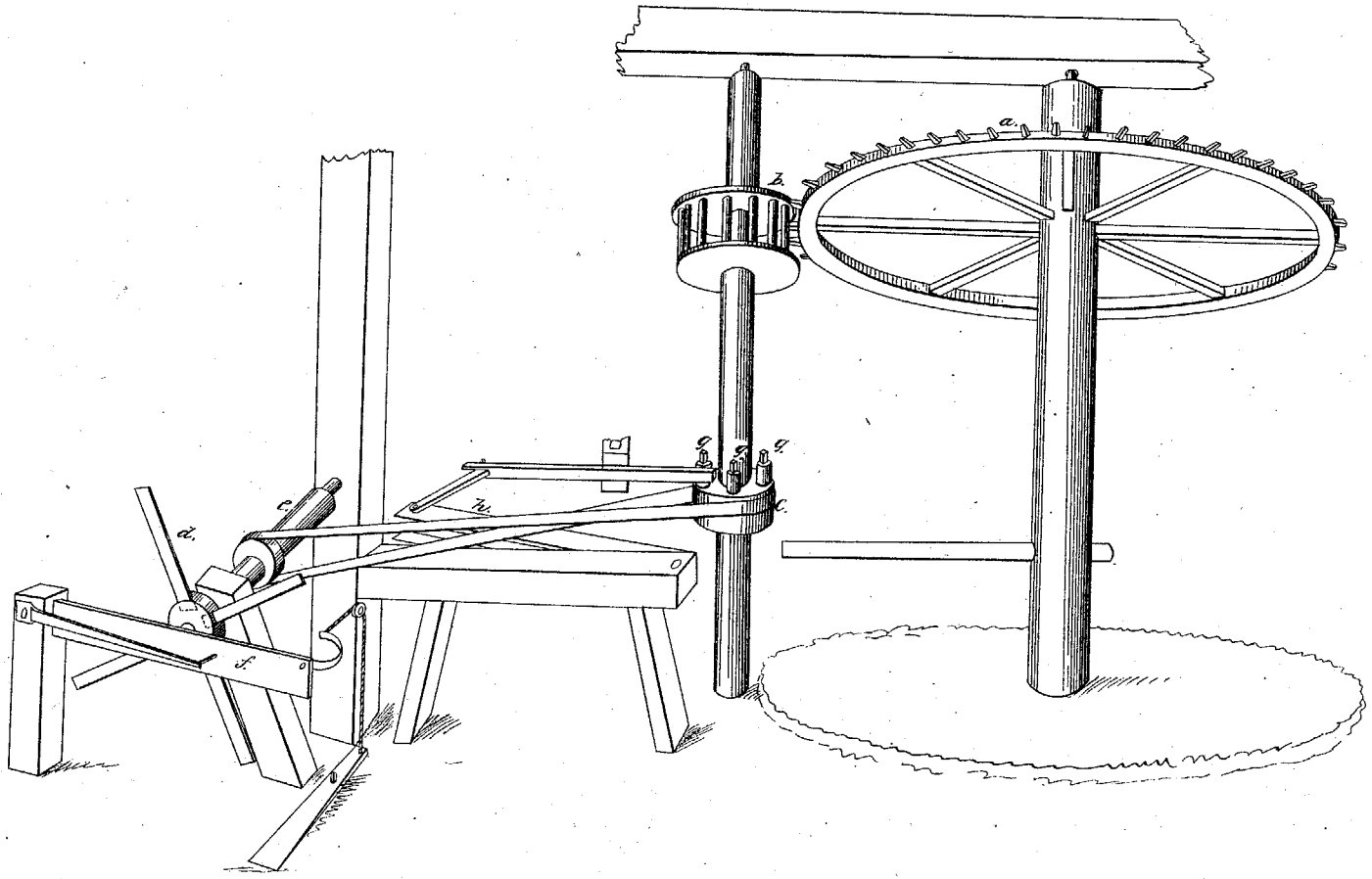

Dec 24 1811

Archibald Tanner 1597X

Letters Patent

The Schedule referred to in these Letters Patent and making part
of the same Containing a description in the words of the said Arch
-ibald Tanner himself of his Machine for Breaking and Swingling
Hemp & Flax.

This machine is to be put in motion by the force of
men or animals, wind, water or steam as circumstances may
render necessary or convenient, But as animal force may be most
generally applied, I shall proceed to describe the machine as deriving
its motion from that source. A horizontal spur wheel of any con
-venient diameter is turned by a horse or other animal. This spur
wheel communicates motion to another wheel or trundle head
on an upright shaft which also carries a horizontal band
wheel that gives motion to the scutching wheels by bands or straps
passing over wheels or pulleys on the axis of the said scutching wheels.
The scutching knives extend from the wheels in the line of the Radii.
The axes of these wheels lie in an inclined position so that the knives
incline from the vertical line which mode of placing the axis I par
-ticulary claim as my invention. But the axis may be placed
horizontally if the constructor pleases. The scutching board over
which the flax or hemp is held to be swingled is advanced to the
knives by a pedal or treadle and withdrawn by a spring at the
option of the operator. A number of vertical projecting pins rising
above the band wheel with friction rollers on them by striking
against a moving arm or lever by means of a pitman that ex
-tends from the lever to the moving jaw of a break gives motion to
the break by the revolution of the wheel. There may be any number of these
breaks and scutching wheels moved by the same band wheel at the will of
the constructor of the machine and if thought advisable chains may
be substituted for bands and cog or spur wheels trundle heads and Addresses for Communicating Matters
Pitcher Freeman — Architects Tanner
Messrs McCourt Son
Sec Lyon Sub
Mgt.

[360 words

Drawing under Ass 1800.

1597X